United States Patent
Tuin et al.

(10) Patent No.: US 7,178,783 B2
(45) Date of Patent: Feb. 20, 2007

(54) AUTOMATIC VALVE CHARACTERIZATION OF DIGITAL VALVE POSITIONERS

(75) Inventors: Rienk Tuin, Dhahran (SA); Patrick S. Flanders, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 10/532,068

(22) PCT Filed: Oct. 10, 2003

(86) PCT No.: PCT/US03/32438

§ 371 (c)(1),
(2), (4) Date: Jan. 23, 2006

(87) PCT Pub. No.: WO2004/033956

PCT Pub. Date: Apr. 22, 2004

(65) Prior Publication Data

US 2006/0118745 A1    Jun. 8, 2006

(51) Int. Cl.
*F16K 51/00*    (2006.01)
(52) U.S. Cl. ............................. 251/129.04
(58) Field of Classification Search ........... 251/129.04, 251/129.01
See application file for complete search history.

(56) References Cited

U.S. PATENT DOCUMENTS

| | | | | |
|---|---|---|---|---|
| 4,926,903 A | * | 5/1990 | Kawai | 251/129.04 |
| 5,190,068 A | * | 3/1993 | Philbin | 137/8 |
| 5,878,765 A | * | 3/1999 | Lange | 137/1 |
| 6,155,283 A | * | 12/2000 | Hansen et al. | 137/1 |
| 6,202,680 B1 | * | 3/2001 | Irokawa et al. | 251/129.04 |

* cited by examiner

*Primary Examiner*—John Bastianelli
(74) *Attorney, Agent, or Firm*—Abelman, Frayne & Schwab

(57) ABSTRACT

A digital valve positioner is controlled to automatically characterize a valve to provide a linear relationship between the valve control signal and the amount of flow.

18 Claims, 7 Drawing Sheets

$$k_{30} = \frac{10}{40} = 0.25 \qquad k_{80} = \frac{40}{20} = 2$$

FIG. 7
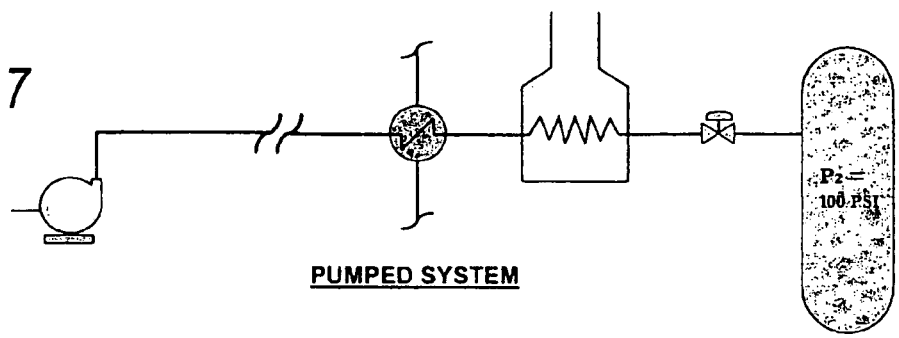
PUMPED SYSTEM
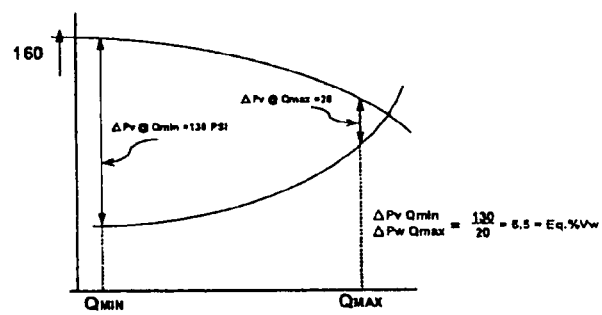
FIG. 8
FIG. 9
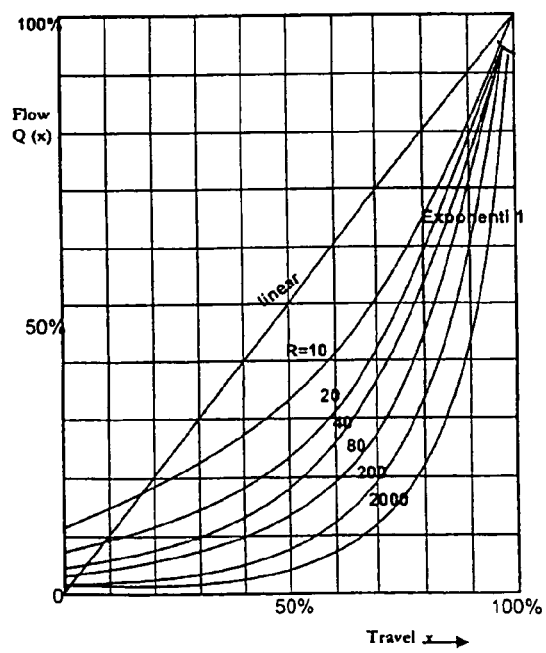

FIG. 14
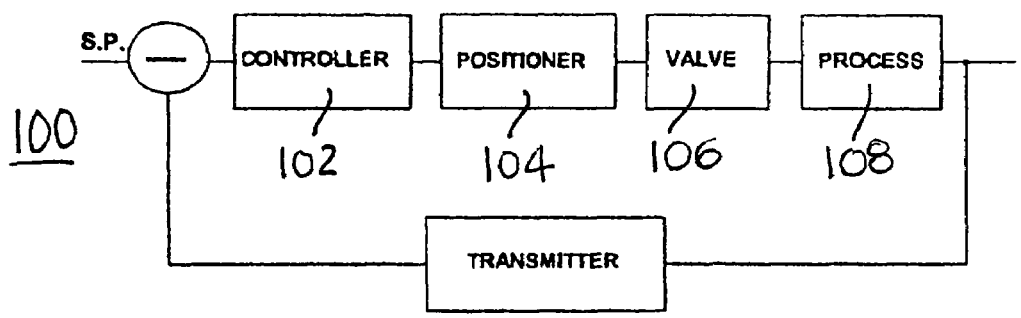
FIG. 15
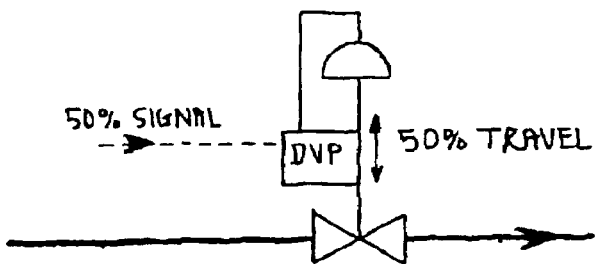
Standard Valve Positioner Function
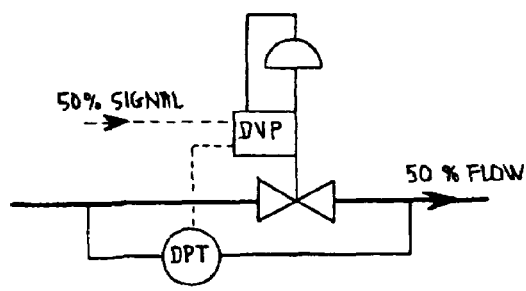
Automatic Valve Characterizer (AVC) Function
FIG. 16

AUTOMATIC VALVE CHARACTERIZATION OF DIGITAL VALVE POSITIONERS

FIELD OF THE INVENTION

This invention relates to digital valve positioners that are used to control valves to accurately open and close those valves to control the flow rate of fluids through pipelines in industrial processes.

BACKGROUND OF THE INVENTION

Digital devices, such as digital valve positioners, are utilized to control electromechanical and hydraulic valve positioners to open, close and adjust the position of valves in a wide variety of industrial and commercial applications. Installed flow characteristics, such as the rate of fluid flow, through a valve mounted in a process pipeline are dependent upon a number of variables. These variables include the type of valve; the type of trim and the friction losses in the process equipment and piping system; the nature of the fluid, i.e. gaseous or liquid; and the temperature, pressure, density and viscosity of the fluid.

At present, digital valve positioners can provide data such as flow and differential pressure. However, the digital control devices of the prior art are not capable of collecting additional process data that is required to optimize the position of the valve, or the rate of change of the valve closure member, in order to maintain a steady-state throughout the process system.

Also missing from the prior art are auxiliary devices that include memory, or data storage devices, processors and transmitters, for processing this additional data in order to optimize a given valve's movement and final position in the context of a process loop and/or production facility.

For example, in a petroleum refinery or a petrochemical production facility, a number of different feedstreams, some of which may be liquid and some of which are gaseous, must be introduced into and removed from reactors, fractionators, distillation columns, catalytic crackers and the like, all at carefully controlled rates. If it is desired to increase or reduce the rate of production of a given end product, or of a by-product, changes to the valves controlling the flow-rates of the feedstreams, product take-off streams, heat exchange fluids and the like must be adjusted accurately under stable control.

In order to maximize controllability, certain operating companies assign significant pressure drops across control valves during project design, sometimes as much as 50% of the total system friction losses at design flow. The resultant changes from the inherent flow characteristic can be minimized by increasing the ratio of the control valve differential pressure at maximum versus minimum travel positions. However, this will result in significantly higher energy costs to run the plant.

Currently available digital control valve positioners offer a valve characterization feature to allow the installed flow characteristic to be modified manually.

As is well known to those skilled in the art, the adjustments necessary to bring such a system to a steady-state are numerous and time-consuming, can involve an element of danger, and can be costly in terms of both personnel time and loss in production efficiency. Moreover, the successful control of the process variables often depends upon the personal experience, care and talent of one or more engineers and plant workers. Following start-up of a new facility, or a new production system or loop, several months may be required for operations personnel to study each control loop and to optimize the operating data on a trial-and-error basis.

This task of properly matching the valve characteristic to the process requirement is an old problem that has required a time and labor-intensive effort and engineering knowledge to solve. The characterization of the valves required accurate process data collection, selection of the proper valve trim set on a trial-and-error basis and a careful analysis of the resultant installed flow characteristic based on measurements taken at the relevant on-site positions. Although optimum valve characterization is possible with conventional control systems on the market today, it is seldom actually achieved.

One proposal for controlling valves by seeking to produce linearity between the positioning signal controlling valve travel and the quantity of flow is set forth in U.S. Pat. No. 5,878,765 to Lange. This proposal entails obtaining a hydraulic profile of the flow based on measurements of the actual flow or the pressures upstream and downstream of the valve, and performs linearization using, for example, a specialized diaphragm or other mechanical element or specialized non-linear correction circuitry.

The present invention uses commercially available technology to go beyond these prior methods to a method and apparatus that automatically linearizes the non-linear relation between the input control signal of the digital positioner and the flow over the required travel range. The present invention is also adapted to automatically obtain constant static loop gain for, e.g., two or more valves installed in parallel.

OBJECTS AND SUMMARY OF THE INVENTION

It is therefore an object of the invention to provide an apparatus and method for automatic valve characterization in digital positioners used with the valves to greatly simplify the valve characterization process, and thereby save many man hours per loop and improve the overall control performance of the process.

It is also an object of the invention to provide a method and apparatus for obtaining data from a digital valve positioner and integral automatic valve characterization function to provide valve diagnostics, control performance indicators and process system diagnostic features.

It is another object of the invention to provide an automatic valve characterization function using standard, readily available components that will substantially reduce the cost of characterizing the large number of valves found in most plants and facilities.

Further objects of the invention are (1) to enable users to quickly and automatically obtain a linear control characteristic; (2) to provide constant gain over the required flow range; (3) to provide a solid basis for tuning the controller to optimum settings; and (4) to provide a solid regulatory control platform for advanced control strategies.

The above objects and other advantages are achieved in one embodiment of the invention by a smart valve positioner that is modified to obtain, and preferably store, the necessary process data for eventual transmission to, or collection by, a transmitter that is located external to the positioner.

In another preferred embodiment, the AVC is performed by an additional computation function block in a control system that is external to the smart valve positioner.

In other aspects, the AVC function is performed in accordance with defined and advantageous methods.

BRIEF DESCRIPTION OF THE DRAWINGS

FIG. 7 illustrates a process system with high friction losses.

FIG. 8 is a plot of Q versus ΔP for the valve of FIG. 7.

FIG. 9 illustrates the effective equal percentage valve flow characteristic in different process systems with increasing friction losses.

FIG. 14 is a schematic drawing of a control loop.

FIG. 15 is symbolic drawing of a control valve with positioner providing accurate travel control (i.e. a 44% signal will provide a 44% travel).

FIG. 16 is symbolic drawing of a control valve with AVC positioner providing accurate flow control (i.e. a 66% signal will provide a 66% flow).

DETAILED DESCRIPTION OF THE PREFERRED EMBODIMENTS

1. Definitions

Figure 1:
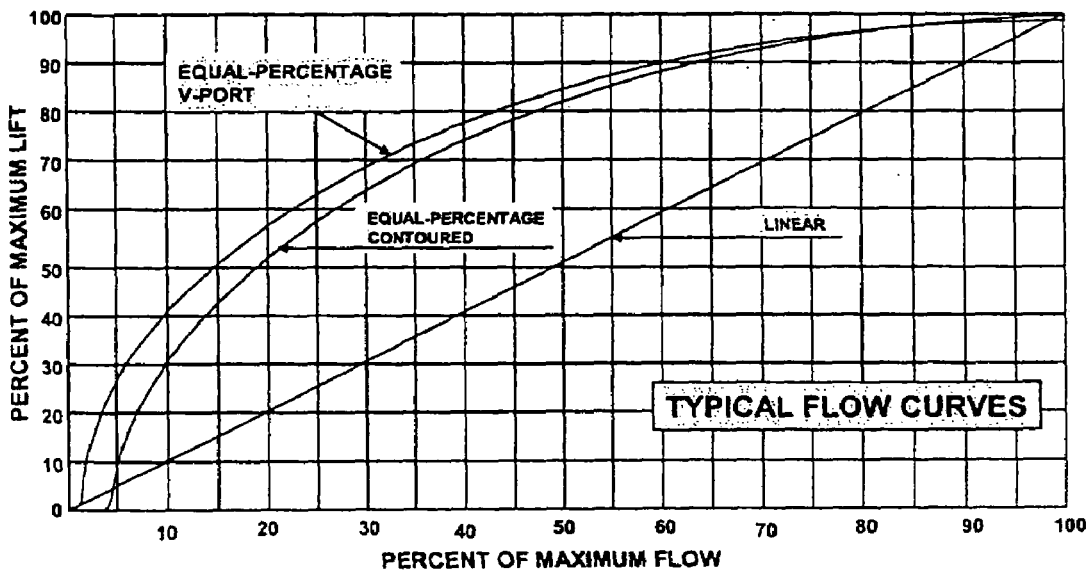
FIG. 1 is a graph of typical flow curves for linear and equal percentage valve trim.

As used herein, the following terms will have the meanings indicated:

Inherent Flow Characteristic:

This is the flow characteristic of a valve obtained under constant differential pressure conditions as detailed in ISA 75.11—Inherent Flow Characteristic And Rangeability Of Control Valves. The manufacturers test the control valves under constant differential pressure conditions and provide an inherent flow characteristic for each control valve.

Installed Flow Characteristic:

This is the flow characteristic of a valve in a process installation representing the relationship of flow through the system versus the travel of the valve (i.e. the percentage of opening, or the degree of rotation, of the valve closure member). The installed flow characteristic is unique for each valve installation, as very few identical valves will be installed in exactly the same piping systems operating under the same differential pressure conditions in another process system. The larger the ratio is of the valve pressure drop under maximum flow conditions to the valve pressure drop under minimum flow conditions, the more the installed flow characteristic will deviate from the inherent flow characteristic as tested by the valve manufacturer under constant differential pressure conditions. Major friction elements in a process installation may include, for example, a furnace, a pump, a compressor and an in-line mixer, and excessive piping friction may arise due to long lines, piping bends or high fluid velocities.

Modified Installed Flow Characteristic:

This is the installed flow characteristic as modified to achieve a desired result. In the present invention, the relation of flow through the system to the travel of the valve is advantageously modified electronically to result in a linear or substantially linear modified installed flow characteristic for the required travel range.

Constant Static (Steady-State) Control Valve Loop Gain:

This is a constant static relationship between the control signal for controlling travel of the valve and the control valve flow output over a defined range of process conditions.

Automatic Valve Characterization ("AVC"):

This is the process of automatically matching the control valve's installed flow characteristic with the process characteristic to achieve constant steady-state gain, advantageously unity steady-state gain.

Linear Installed Flow Characteristic:

This is a modified installed flow characteristic after correction to linearity, achieved in the present invention using the AVC. This can be achieved electronically to provide a linear relation between the input signal to the positioner and the flow through the control valve.

Control Loop:

An assembly, consisting usually of a controller, control valve, sensor and transmitter operating in control of a process, designed to control that process around a defined setpoint.

Furthermore, in the following discussion and in the figures, the following abbreviations are used:

a=the ratio of the differential pressure across the control valve at the lowest possible flow conditions close to 0% travel versus highest possible flow conditions close to 100% travel.

ar=the ratio of the differential pressure across the control valve at the specified minimum flow conditions versus specified maximum flow conditions.

DVP=Digital Valve Positioner

DPT=Differential Pressure Transmitter

LC=Level Controller

FC=Flow Controller

Tx=Transmitter of process variable

Ctrl=Controller

2. General Environment

The following discussion summarizes the environment in which the present AVC method and apparatus are so advantageous.

The present invention relates to all control valves installed in any industry. It automatically provides constant static loop gain for all such control valves installed in any process system. The main objectives are to start-up critical process plants safely and to obtain constant static loop gain and robust control automatically.

The present invention is also of particular interest to applications requiring optimum control system tuning for maximum control performance and minimum process variability.

Further, the differential pressure measurement across the control valve as related to the valve position measurement provides valuable information in process control performance optimization studies. This is in addition to the primary process measurement, controller output, set-point and other process parameters. The pressure drop across a control valve is functionally reverse to the flow through the process system. The changes in differential pressure across a control valve are commonly larger than the actual pressure changes in the main process equipment.

The present invention also provides constant static loop gain for two or more control valves installed in parallel, configured either as valves operating in a parallel mode or configured as valves operating in a split range mode.

The present invention is also a fast linear flow control system without the need for a flow meter and without the need for a standard process controller. Substantial savings can be made in flow control systems without the expense of a flow meter, especially in large size piping (e.g. 30" vapor overhead line) and high ANSI Class rated piping systems (e.g. API 10000 gas well head flow line).

The invention is also a fast slave flow control system for use in a cascade control loop without the need for a flow meter.

3. Process Systems

A control system can generally only be tuned for maximum performance when constant static loop gain has been established for all operating conditions between the required minimum travel position and the required maximum travel position. Such a constant static loop gain in turn can be established only when a linear relation is provided between the input (control) signal of the digital valve positioner and the flow through the valve for all operating conditions between the minimum and maximum travel positions. Under these circumstances, equal changes in travel will then result in equal changes in flow.

This linear relation in a particular process system can be obtained by modifying the installed flow characteristic to match the hydraulic friction profile of the process system over the required operating flow range.

In process systems with hydraulic friction losses, the inherent flow characteristic of a control valve provided by the manufacturer is obtained under constant differential pressure conditions. It changes as a function of the amount of hydraulic friction loss in the process system. This can vary depending upon the type of valve used. For example, for globe control valves, manufacturers typically offer both linear and equal percentage type trims. FIG. 1 illustrates some typical flow curves.

Figure 2:
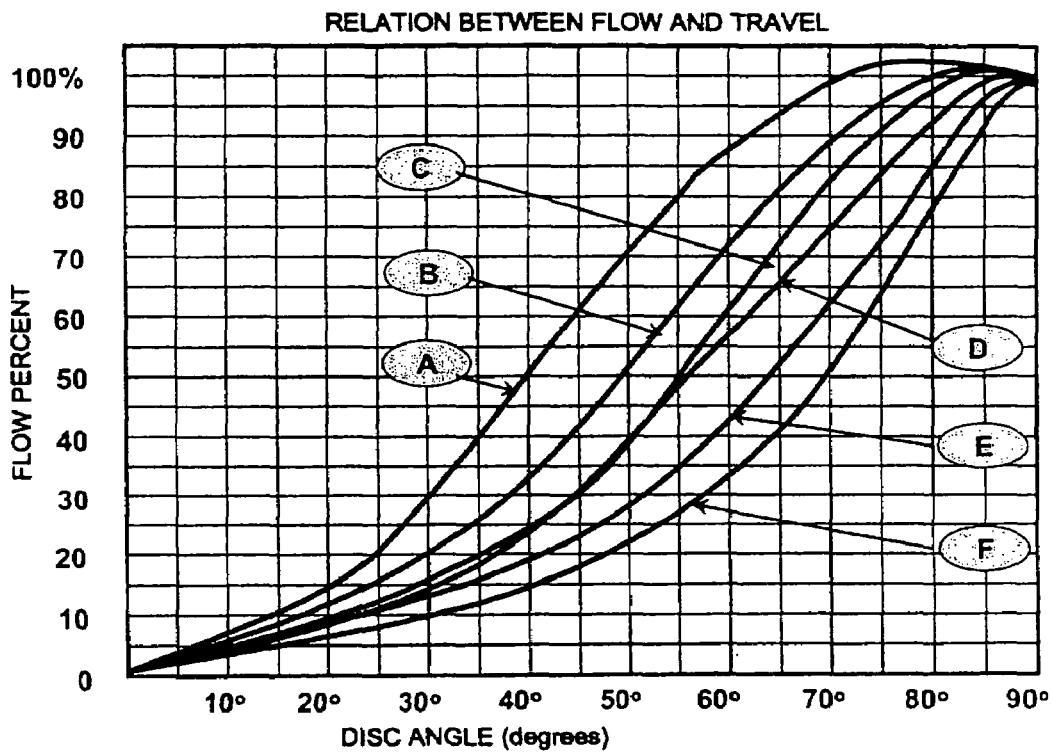
FIG. 2 illustrates the relation between flow and travel for butterfly control valves.

On the other hand, most butterfly type control valves offer some form of modified equal percentage type flow characteristic, and linear type characteristics are not commonly available. FIG. 2 illustrates the relation between flow and travel (in terms of the disc angle) for six different valves A–F of this type.

Figure 3:
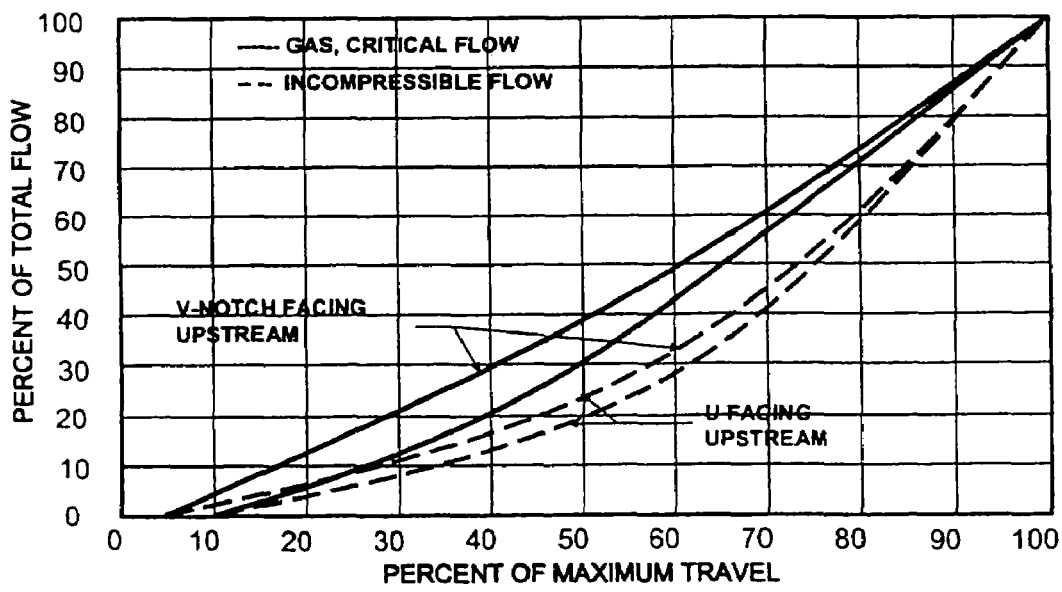
FIG. 3 illustrates the relation between flow and travel for rotary control valves.

For ball, segmented ball, cam and other rotary type valves, modified equal percentage type trims are typically provided, with only a few manufacturers offering linear type trims. FIG. 3 illustrates typical relations between flow and travel for two configurations of these valves.

In addition to the different types of valves, different process systems will have different amounts of friction losses. When the control valve is installed in a process piping system with hydraulic friction losses, then the inherent flow characteristic of the control valve changes in dependence on the amount of friction losses in that process system to an installed flow characteristic. For process systems with relatively low friction losses, the preferred control valve should have an inherent flow characteristic that is linear. This is because the installed flow characteristic will be only marginally changed by the low friction losses. Consequently, an acceptable linear relation between the input control signal of the digital positioner and the control valve flow can be achieved comparatively easily for the required operating conditions.

Figure 4:
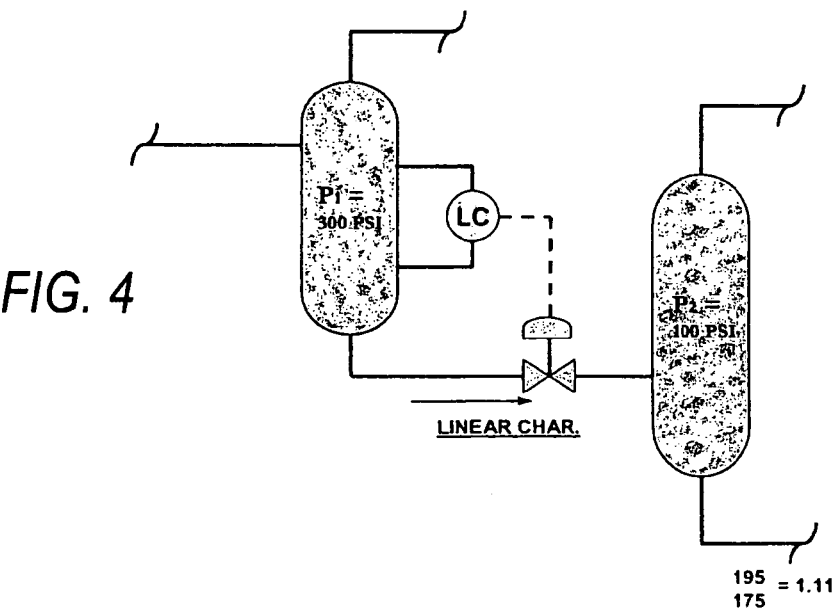
FIG. 4 illustrates a process system with low friction losses.
Figure 5:
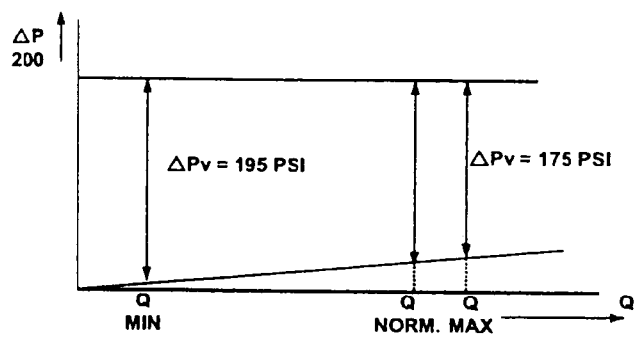
FIG. 5 is a plot of Q versus ΔP for the valve of FIG. 4.
Figure 6:
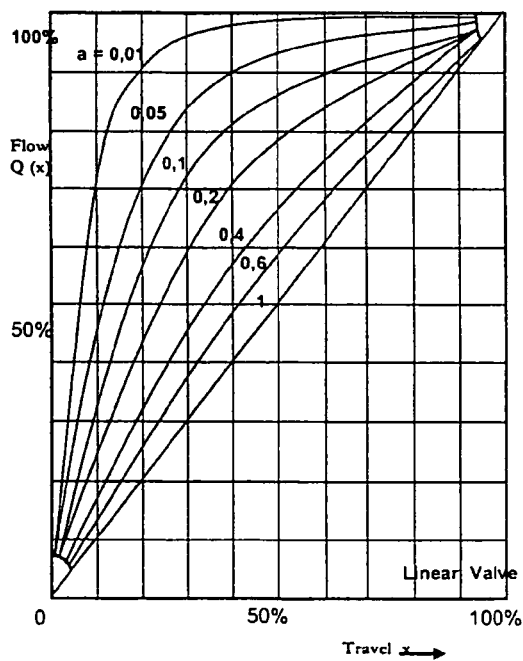
FIG. 6 is illustrates the effective linear valve flow characteristic in different process systems with increasing friction losses.

FIG. 4 schematically illustrates a process system with low friction losses. A linear inherent flow characteristic in valve 10 will provide the most linear installed flow characteristic in this process system and would therefore be the best choice. The valve 10 is controlled by a digital positioner 12 in response to an input control signal from a digital controller 14. FIG. 5 is a plot showing the flow Q and the system pressure losses of FIG. 4 and the remaining differential pressure $\Delta P$ across the control valve. FIG. 6 is a general plot showing the effective installed valve flow characteristic of a linear valve in different process systems with increasing friction losses.

Generally, a linear flow characteristic may be selected when the ratio of differential pressure across the control valve at minimum flow versus maximum flow is equal to or less than 1.5. In the above example, the ratio is 1.11 and a linear flow characteristic is most suitable for the subject process systems with low friction losses.

FIG. 6 shows the change of the inherent linear flow characteristic as a function of the friction losses in the process system. The more friction losses occur in a process system, the larger the ratio of the control valve pressure drop under minimum flow versus maximum flow will be. Because for the above process application this ratio is only 1.11, the change from the original linear characteristic is small. The installed flow characteristic at ar=1.11 will be closest to the inherent linear flow characteristic at a=1.

This graph also shows that when a linear flow characteristic is installed in a process system with relative high friction losses (e.g. a=100), then the linear flow characteristic changes to a very non-linear flow characteristic with large changes in process gain at 20% travel.

On the other hand, the inherent equal percentage flow characteristic is specifically designed for control valves installed in process systems with high friction losses. This is because the installed flow characteristic will be significantly changed by the high friction losses. The resulting installed flow characteristic will then become reasonably linear over a limited travel range due to the large changes in differential pressure conditions across the control valve. In the following example of FIGS. 7–9, there are high friction losses in the piping system between the pump suction and the vessel. Consequently, an equal percentage type valve would be the best choice.

Generally, an equal percentage flow characteristic may be selected when the ratio of differential pressure across the control valve at minimum flow versus maximum flow is more than 1.5. In this example, the ratio is 6.5 and an equal percentage flow characteristic is most suitable for the subject process systems with high friction losses.

FIG. 7 schematically illustrates a process system with high friction losses. An equal percentage inherent flow characteristic in valve 20 will provide the most linear installed flow characteristic in this process system. The valve 20 is controlled by a digital positioner 22 in response to an input control signal from a digital controller (not illustrated). FIG. 8 is a plot showing the flow Q and the system pressure losses of FIG. 7 and the remaining differential pressure $\Delta P$ across the control valve. FIG. 9 illustrates the effective equal percentage valve flow characteristic in different process systems with increasing friction losses.

This graph shows the change from the inherent equal percentage flow characteristic in dependence on the friction losses in the process system. The more friction losses occur in a process system, the larger the ratio of the control valve pressure drop under minimum flow versus maximum flow will be. Because for the above process application this ratio is 6.5, the change of the inherent equal percentage characteristic will be significant. The installed flow characteristic at ar=6.5 will be closest to the equal percentage flow characteristic at a=5.

This graph also shows that when an equal percentage flow characteristic is installed in a process system with high friction losses (e.g. a=10), then the equal percentage flow characteristic changes to a reasonable linear flow characteristic with reasonable constant gain over the medium travel positions. However, for good control at the upper travel positions, the changes in gain are still too much, and modification to this section of the characteristic is essential to obtain constant gain within 1+/−33%.

4. Problems Faced

For above two examples, the selected flow characteristics are almost ideal and can provide acceptable constant gain over the required flow range. However, many cases do not allow for the matching of a particular type of valve with the relative friction loss of the system. For process systems with moderate friction losses, neither an inherent linear flow characteristic nor an inherent equal percentage flow would provide an acceptable linear relation over a wider range of flow conditions.

These problems can be resolved in the present invention by automatically characterizing the non-linear installed flow characteristic such that a linearized installed flow characteristic is obtained and constant loop gain can then be accomplished. A linearized installed flow characteristic is an electronically linearized installed flow characteristic of a control valve in a process system providing a linear relation between the input signal to the positioner and the flow through the control valve.

For good control performance, it is essential that an acceptable linear installed flow characteristic be provided and that a constant loop gain is established to limit process variability to a minimum. The actual valve gain is not important as long as it is constant. However, the overall static loop gain should be approximately 1 (+/−33%). This means that the gain variation should be within a factor of 2.

The objective is to have constant gain and to obtain robust tuning for maximum control performance over the required flow range. This also enables the plant to minimize or eliminate interaction between control loops in a process unit. This is particularly important for any liquid/vapor equilibrium process system such as a boiler, fractionating unit, crude distillation unit etc. in which small changes in pressure or temperature can result in significant load changes and significant changes in process variability and product quality.

Figure 10:
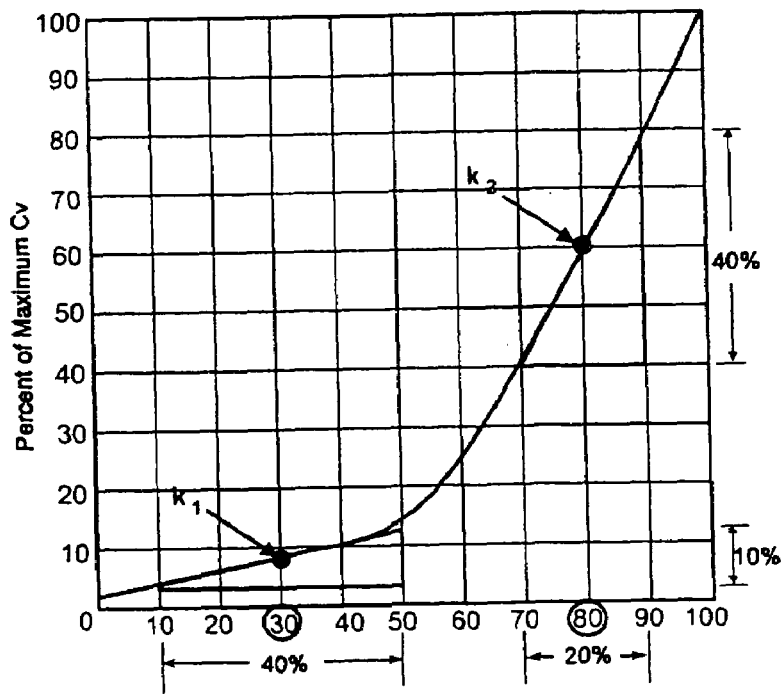
FIG. 10 is a plot illustrating change in static loop gain of a butterfly valve installed in a low friction system.

FIG. 10 is an example of a non-linear installed flow characteristic of a combustion air blower with a flow controlled butterfly valve in the discharge system. Specifically, FIG. 10 illustrates the example of a butterfly valve, with an inherent equal percentage flow characteristic, installed in a low friction loss process system, wherein there is a change in the static loop gain k by a factor of approximately 8 between a lower travel position 30 ($k_{30}$=0.25) and an upper travel position 80 ($k_{80}$=2).

Due to very low friction in the oversized air piping system, the installed flow characteristic of the butterfly valve is almost identical to the inherent flow characteristic. The butterfly valve has been selected to obtain the maximum flow at approx. 60% travel. At normal flow conditions the valve will operate between 45% and 55% travel. At minimum duty the valve will operate at approx. 30% travel.

Unfortunately, the flow characteristic is very non-linear and provides a large change in gain between 40% and 60% travel. At 40% travel the loop gain is approx. 0.25 and at 60% the valve gain is approx. 2. The required PID tuning parameters at 40% travel will be quite different from the required tuning parameters at 60% travel. Over this small travel range, the valve gain and the static loop gain changes by a factor of 8. Note that for good control performance, the overall static loop gain should remain constant and be approximately 1+/−33%. This means that the gain variation should be within a factor of 2.

It is not possible to use an average tuning method to obtain suitable control over this required travel range. In fact, this non-linear control system provides a hazard to the critical combustion process of the furnace. It will also be very difficult, if not impossible, to safely control excess air in the flue gas system.

The above installed flow characteristic needs to be modified such that an acceptable linear relation can be obtained and that constant loop gain can be established in order to ensure safe furnace operating conditions.

An additional factor is that, in order to optimize process control, certain operating companies assign significant pressure drops across control valves during project design of more than 50% of the total system friction losses at design flow. The changes from the inherent characteristic will be minimized by increasing the ratio of the control valve differential pressure at maximum travel versus minimum travel position. However, this also results in significantly higher energy costs to run the plant.

For such systems and for process systems with moderate friction losses, which would include the operating conditions of most systems, neither an inherent linear flow characteristic nor an inherent equal percentage flow characteristic will provide a reasonable linear relation between the control signal and the flow over a wide range of flow conditions. Hence, manual modification has been used to try to establish this linear relation. As noted above, this manual process was burdensome, difficult and time consuming, and is particularly not practical during the start-up of a large process unit with, for example, several hundreds of control valves.

5. The AVC Solution

The present invention provides a method and apparatus by which the relation between the process system and the control valve is automatically linearized, without requiring manual intervention by the plant employees. Using this "AVC," a constant static loop gain is automatically obtainable for any control valve in any process system. Having the ability to tune each control loop to its best performance also enables the user to eliminate, or at least reduce, interaction with other control loops within the process unit. This would be particularly important for a liquid/vapor equilibrium process system as discussed above in which small changes in pressure or temperature can result in major load changes.

Thus, the AVC method and apparatus automatically obtain constant static loop gain between the input signal of the digital valve positioner and the control valve flow during the initial flow operations of the valve, e.g. during start-up of a process unit. This will aid in safely starting-up critical and more risky petro-chemical process plants and facilitating optimum tuning for maximum performance.

With the present AVC method and apparatus, the relation between the process system and control valve will be automatically linearized. With this, a constant static loop gain can be automatically obtained for any control valve in any process system. Having the ability to tune each control system to its best control performance over a wide flow range also enables the user to eliminate or reduce interaction between other control loops in a process unit.

The preferred embodiments of the invention discussed below will be referenced in detail to various examples which are illustrated in the drawings. The examples are provided to explain the invention in detail, but these examples should not be regarded as limitations of the invention. For example, features illustrated or described as part of one embodiment can be used on another embodiment to yield still a further embodiment. It is intended that the present inventions cover such modifications and variations. Additionally, the methods provided are typical principles to accomplish a particular function, but these methods should not be regarded as limitations of the invention.

According to the present invention, these objects are attained in that during start-up of a process unit in which the feed flow is continuously increased, and consequently all other downstream flows are simultaneously increased, the constant static loop gain characteristic automatically evolves for each control valve and the slope of the static loop gain of each control valve is settled (i.e. has been ascertained) after the maximum travel position of each control valve has been reached (e.g. even if that occurred only momentarily).

In accordance with the present invention, several preferred embodiments of the method are proposed. The first embodiment begins by first defining a practical minimum travel position. This is because it is well known that as a valve is initially opened from a fully closed position, the resultant change in flow will be highly non-linear. To avoid this problem, it is common practice to operate most control valves above 10% travel, and this may be chosen for use in the inventive method. Other practical minimum travel positions could be at the minimum flow condition specified on the control valve specification sheet or the minimum flow condition as published on the control valve calculations sheet. For practical implementation, it is preferred to select this minimum travel position at or above approximately 10% to avoid the less accurate and less repeatable lower flow conditions below 10%.

Figure 11:
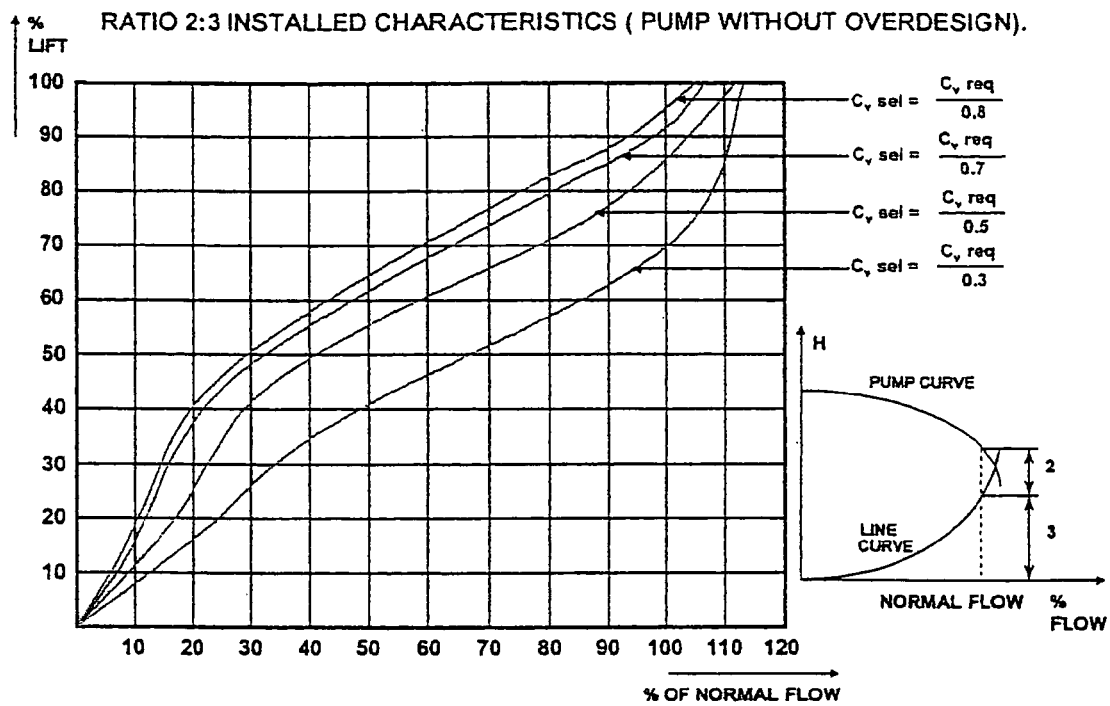
FIG. 11 is a plot of installed flow characteristic curves for different values of flow coefficient.
Figure 12:
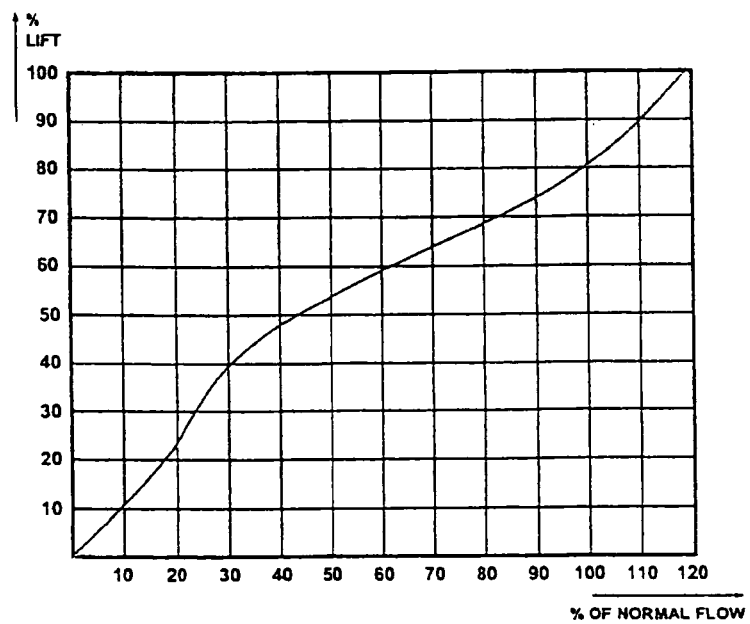
FIG. 12 is a plot of a selected one of the curves of FIG. 11.

The next step is to gradually increase the input control signal to the digital valve positioner in a manner corresponding to the intended range of travel for this specific process. The increased control signal correspondingly increases the travel position, starting from the selected minimum travel position of the valve, thereby gradually increasing the flow through the valve. At each operating point, the digital valve positioner records the input control signal, the % lift (i.e. the travel position) and the amount of flow, measured as a percentage of normal flow. The % lift plotted against the % flow generates the installed flow characteristic. FIG. 11 is a plot of such installed curves for four different selected values of $C_V$ (flow coefficient). For ease of understanding, the installed flow characteristic for $C_{Vsel}=C_{Vreq}/0.5$ is reproduced alone in FIG. 12.

Figure 13A:
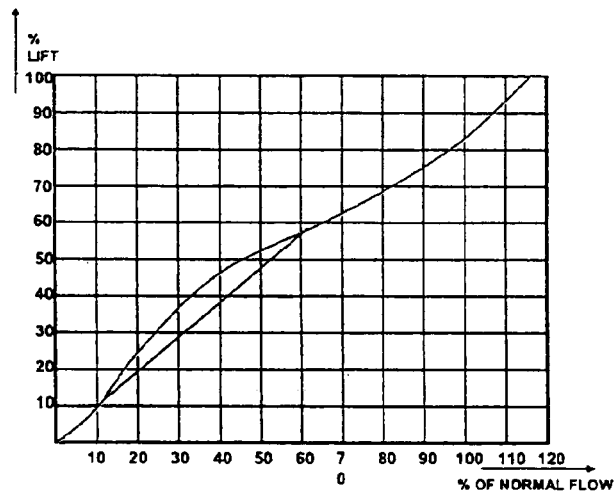
FIGS. 13A–13C are plots of linear fits for the curve of FIG. 12 to three maximum travel positions.
Figure 13B:
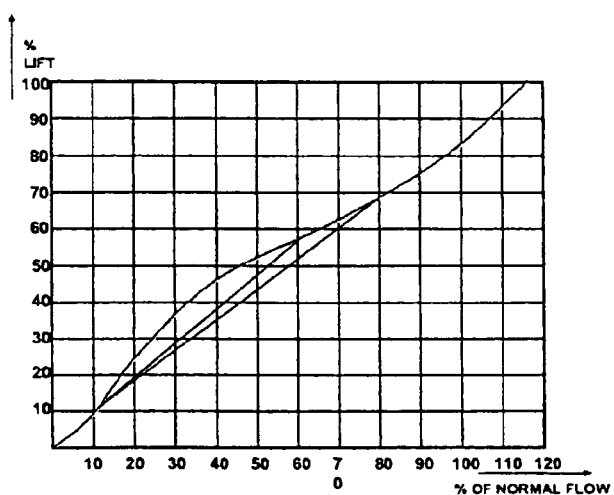
Figure 13C:
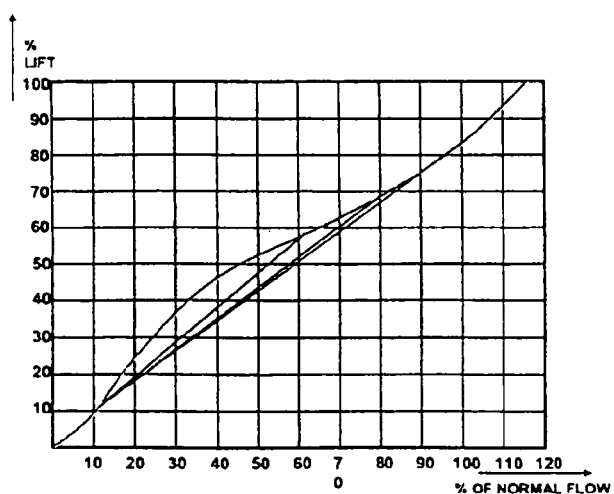

For each operating point in the installed flow characteristic, as it is measured, a straight line is fitted between the minimum travel position and the current travel position. This straight line represents the static loop gain. FIGS. 13A–13C illustrate three different upper travel positions, i.e. positions yielding 60% of normal flow, 80% of normal flow and 90% of normal flow.

Advantageously, the straight line fitted between the selected minimum travel position and the highest attained travel position to be used for this particular process is selected to be used as the modified installed flow characteristic. This provides a reasonable fit over the entire series of operating points, i.e. over the range of travel positions and their respective control signals and amounts of flow.

It should be noted that during flow increases, the straight line changes to the next higher position. However, when the flow decreases, the AVC will continue to operate on the last established straight line.

It is important that the static loop gain be constant, i.e. that the modified installed flow characteristic is linear. The actual gain, i.e. the slope of the straight line, is less important.

FIG. 14 illustrates schematically a control loop 100 used to implement a preferred embodiment of the method. The control loop 100 includes a controller 102, a digital positioner 104, a control valve 106, a process block 108 and a feedback block operating in control of the process, designed to control that process around a defined setpoint.

FIG. 15 is symbolic drawing of a control valve with positioner providing accurate travel control (i.e. a 44% signal will provide a 44% travel).

On the other hand, FIG. 16 illustrates the result achieved by the present invention. In FIG. 15, a 50% control signal results in a 50% valve opening, but because of frictional losses this may not result in a 50% flow. In FIG. 16, representing the result of using the modified installed flow characteristic, i.e. the selected straight line, the 50% control signal results in a 50% flow.

6. Summary of Methods

Some of the many methods within the scope of the present invention will now be summarized, with the above-described method being "Method A" below.

Method A "Minimum Travel Position Reference Point"

In this method, every time that the valve travel and the consequent flow are increased, this new higher travel position reference point in the installed flow characteristic is connected by a straight line to the pre-selected minimum travel position reference point. This partial straight line is the partial modified installed flow characteristic between these travel positions.

When the flow is decreased, the valve will operate on this straight line, i.e. on the just realized partial modified installed flow characteristic. It is important that the static loop gain is constant (i.e. that the modified installed flow characteristic is a straight line). The actual gain or the slope of the modified installed flow characteristic is less important.

When the flow is increased again, the valve will continue to operate on this straight line (i.e. on this partial modified installed flow characteristic) until the travel position exceeds the previously attained highest travel position and then the valve will operate again on the installed flow characteristic. When the flow is decreased again, the valve will operate on the lastly created straight line (i.e. on the last realized partial modified installed flow characteristic).

Eventually the modified installed flow characteristic, or the straight line, will be established between the highest obtained maximum travel position and the pre-selected minimum travel reference position. This AVC method is fully automatic and ensures constant static loop gain and a safe and stable platform for optimizing the controller tuning further.

Method B Zero Axis as "Minimum Travel Position Reference Point"

This method B is similar to method A except that the selected minimum travel position reference point in method A is replaced with the zero axis in method B.

Accordingly, every time that the valve travel and the consequent flow are increased, this new higher travel position reference point in the installed flow characteristic is connected with a straight line to the zero axis. This partial straight line is the partial linearized installed flow characteristic.

When the flow is decreased, the valve will operate on this straight line (i.e. on the just realized partial linearized installed flow characteristic). As in method A, it is important that the static loop gain is constant (i.e. that the installed linearized flow characteristic is a straight line). The actual gain (i.e. the slope of the linearized installed flow characteristic) is less important.

When the flow is increased again, the valve will continue to operate on this straight line (i.e. on this partial linearized installed flow characteristic) until the travel position exceeds the previously attained highest travel position and then the valve will operate again on the installed flow characteristic. Every time that a flow has been increased and the valve travel has been increased, this last new higher travel position reference point in the installed flow characteristic is connected by a straight line to the zero axis. This partial straight line is the partial linearized installed flow characteristic between these travel positions. When the flow is decreased again, the valve will operate on the lastly created straight line (i.e. on the last realized partial linearized installed flow characteristic).

Eventually the linearized installed flow characteristic (i.e. the straight line) will be established between the highest obtained maximum travel position and the zero axis. This AVC method is fully automatic and ensures constant static loop gain (i.e. a safe and stable platform) for optimizing the controller tuning further.

Method C $Y=aX+b$

In this method, a straight line is established as the pre-determined modified installed flow characteristic. At an xy % input signal the positioner, the digital valve positioner will correct the valve characteristic such that to the positioner will control xy % flow regardless of the selected valve flow characteristic. The straight line should cross the installed flow characteristic approximately in the middle to limit the maximum required corrections and to maintain the highest resolution possible.

The flow controller is linear as the actual flow will always reflect the input signal to the positioner.

Method D Linear Control Valve with Actual Flow Signal in Positioner Feedback System of Position Controller A linear flow control function without the need for a dedicated process controller and without the need for a dedicated flow meter can be established by using the flow meter (as defined below) and the actual flow signal directly in the feedback loop of the digital valve positioner. This actual flow signal is calculated from the differential pressure transmitter, the valve position transmitter signal and process data parameters in accordance with ANSI/ISA 75.01—Flow Equations for Sizing Control Valves. The flow controller is linear as the actual flow will always reflect the input signal to the positioner. At an xy % input signal to the positioner, the digital valve positioner will control xy % flow through the control valve regardless of the actual flow characteristic.

The flow meter can be established by (a) using a control valve body as flow meter body, (b) using the trim travel position as Cv capacity, (c) using a differential pressure transmitter across the control valve body measuring the p, (d) locating the pressure tappings on the upstream and downstream piping systems in accordance with ANSI/ISA 75.02, and (e) providing the minimum required upstream and downstream straight length of piping in accordance with ANSI/ISA 75.02. This can provide a measurement repeatability within 0.25%, which is more than adequate for most control requirements.

To meet the 0.25% repeatability, it is essential that the control valve and trim have been tested in accordance with ANSI/ISA 75.02—"Flow Capacity Test for Control Valves" at sufficiently different travel positions.

In another variation, a digital valve positioner is a fast linear controller with the travel position direct in the feedback loop. A fast linear flow controller without the need for a dedicated process controller and without the need for a dedicated flow meter can be established by using the flow meter as defined just above and the actual flow signal directly in the feedback loop of the digital valve positioner. The actual flow signal needs to be calculated from the differential pressure transmitter, the valve position transmitter signal and process data parameters in accordance with ANSI/ISA 75.01—Flow Equations for Sizing Control Valves. For liquid, the temperature measurement can be used from a multivariable transmitter. For vapor and gas, the upstream pressure and temperature measurement can be used from a multivariable transmitter. The fast flow controller is linear as the actual flow will always reflect the input signal to the positioner.

By using the calculated flow signal directly in the feedback loop of the digital valve positioner, the total loop execution time will be shorter than that of a standard digital flow controller loop or a fieldbus flow controller loop. The fast flow controller is linear and provides constant loop gain as the actual flow will always reflect the input signal to the positioner.

A very short macro-cycle and loop time can be obtained when the flow measurement is used in the feedback loop of a digital valve positioner. This only requires a small modification to the current digital valve positioners available on the market. This fast control feature makes this controller very attractive for fast process applications. These applications include, but are not limited to, fast slave control requirements and fast control loops in small liquid lines operating under high differential pressure conditions, where currently a positioner can not be used due to time lag.

The above preferred embodiments set forth methods as to how the Automatic Valve Characterizer (AVC) function can be obtained. Other methods can be developed using similar techniques in different variations. The efficiency and accuracy of the required software for each method or combination of methods is significant. Software options may include, but are not limited to, reverse imaging of the installed flow characteristic, either completely or partially, using tables and using quadratic functions to partially simulate the process friction profile from the process flow measured and the differential pressure measured. The AVC digital positioner may also have additional features to obtain the most accurate automatic characterization method for the particular control valve application in order to maximize the resolution of the control performance.

Thus, when initiated, the AVC function of the digital valve positioner will determine the installed flow characteristic (i.e., from process data and valve position data) and then will automatically modify the valve characteristic to obtain a linear installed flow characteristic. The AVC is accomplished by use of the computing power of the digital valve positioner with which it is associated and the process data, such as flow, differential pressure and the like, that are available in the control system.

Control valve diagnostic features may also be obtained from the AVC function and control performance indicators generated from the available data. Most importantly, process system diagnostic information can also be obtained from the data available in the digital positioner and integral AVC function. As will be apparent to one skilled in the art of process control instrumentation, various systems for so-called "self-diagnostic" devices for valves and other equipment and for process functions have been developed to provide early warnings of deviations that require maintenance or optimization.

A digital valve positioner uses process data that is available in the control system to identify the installed flow characteristic to automatically optimize the valve characteristic to thereby automatically obtain a linear installed flow characteristic over the required flow range. This will provide a stable platform for optimum control.

The AVC function will typically be used after start-up and after changes have been made to the process system or control valve. The AVC function will collect all required process data during operation between the minimum and maximum flow conditions. The installed flow characteristic will be obtained and the valve characteristic will then be automatically characterized (i.e. automatically optimized) to obtain a linear installed flow characteristic which will provide a "constant steady-state control valve gain" for all required operating conditions.

The present invention is thus directed to many systems, including Automatic Valve Characterization systems, to automatically linearize the non-linear relation between the input signal of a digital positioner and the control valve flow. The present invention is also directed to Automatic Valve Characterization systems to automatically obtain constant loop gain for two or more control valves installed in parallel. The present invention is also directed to Automatic Valve Characterization and fast response in flow control systems and also in flow slave control system for use in any cascade control loop.

The present invention has been described above in connection with a single valve, but it will be understood that the automatic characterization process can be applied to multiple valves simultaneously or consecutively. It is particularly appropriate for two or more valves in parallel, all configured as valves operating in a split range mode.

The present invention is also applicable to any process configuration, such as split range of process streams, gap-action, dead-zone, overlap, override control and the like.

The present invention may be used in connection with a digital control valve positioner and a digital differential transmitter with a pneumatic operated control valve, and may also be applied to any other control valve operation, including but not limited to hydraulic, electro-hydraulic, electric or electronically operated control valves.

While the above description has been given in terms of a process plant, the present invention may be advantageously applied in many different types of systems, such as smaller control valves used in, for example, steering systems for ships and in aviation.

While the disclosed methods and apparatus have been particularly shown and described with respect to the preferred embodiments, it is understood by those skilled in the art that various modifications in form and detail may be made therein without departing from the scope and spirit of the invention. Accordingly, modifications such as those suggested above, but not limited thereto are to be considered within the scope of the invention, which is to be determined by reference to the appended claims.

We claim:

1. A method for automatic valve characterization of digital valve positioners, comprising the steps of:
    determining a minimum travel position of a valve through which fluid is to flow in a controllable process;
    inputting a control signal at an initial value to a digital valve positioner that controls a travel position of the valve in response to a value of the control signal, the initial value of the control signal corresponding to the minimum travel position of the valve and a respective amount of flow to define a minimum operating point;
    increasing the value of the control signal input to the digital valve positioner from the initial value to move from the minimum operating point through a series of operating points having respective control signal values, travel positions and amounts of flow, the series ending in a highest operating point defined by a highest travel position used thus far in the controllable process and the respective control signal value and respective amount of flow;
    for each operating point, storing at least the respective travel position and amount of flow;
    automatically generating a graphical straight line fitted between a point represented by the minimum travel position and its respective amount of flow and a point represented by the highest travel position and its respective amount of flow; and
    using the straight line as a modified installed flow characteristic for the valve to control the controllable process.

2. The method of claim 1, wherein the minimum travel position is zero travel.

3. The method of claim 1, wherein the highest travel position is a highest position to be used in the controllable process.

4. A method for automatic valve characterization of digital valve positioners, comprising the steps of:
    inputting a control signal at an initial value to a digital valve positioner that controls a travel position of a valve in response to a value of the control signal, wherein fluid is to flow through the valve in a controllable process, the initial value of the control signal corresponding to a first travel position of the valve and a respective amount of flow to define a first operating point;
    changing the value of the control signal input to the digital valve positioner from the initial value to move from the first operating point through a series of operating points having respective control signal values, travel positions and amounts of flow, the series ending in a second operating point defined by a second travel position used thus far in the controllable process and the respective control signal value and respective amount of flow;
    for each operating point, storing at least the respective travel position and amount of flow;
    automatically generating a graphical straight line fitted between a point represented by the first travel position and its respective amount of flow and a point represented by the second travel position and its respective amount of flow; and
    using the straight line as a modified installed flow characteristic for the valve to control the controllable process.

5. The method of claim 4, wherein the minimum travel position is zero travel.

6. The method of claim 4, wherein the second travel position is a highest position to be used in the controllable process.

7. A method for automatic valve characterization of digital valve positioners, comprising the steps of:
determining a minimum travel position of a valve through which fluid is to flow in a controllable process;
inputting a control signal at an initial value to a digital valve positioner that controls a travel position of the valve in response to a value of the control signal, the initial value of the control signal corresponding to the minimum travel position of the valve and a respective amount of flow to define a minimum operating point;
increasing the value of the control signal input to the digital valve positioner from the initial value to move from the minimum operating point through a series of operating points having respective control signal values, travel positions and amounts of flow, the series ending in a highest operating point defined by a highest travel position used thus far in the controllable process and the respective control signal value and respective amount of flow;
for each operating point, storing at least the respective travel position and amount of flow;
automatically generating a graphical straight line fitted between a point represented by the minimum travel position and its respective amount of flow and a point represented by a selected travel position and its respective amount of flow; and
using the straight line as a modified installed flow characteristic for the valve to control the controllable process between the minimum travel position and the selected travel position.

8. The method of claim 7, wherein the minimum travel position is zero travel.

9. The method of claim 7, wherein the selected travel position is a highest position to be used in the controllable process.

10. Apparatus for automatic valve characterization of digital valve positioners, comprising:
establishing a control loop including a valve through which fluid is to flow in a controllable process, a digital valve positioner that controls a travel position of the valve in response to a value of an input control signal, and a controller for inputting the control signal to said valve positioner,
said valve having a determined minimum travel position in the controllable process,
said control signal having a value that controls a travel position of said valve, an initial value of said control signal corresponding to said minimum travel position of said valve and a respective amount of flow to define a minimum operating point;
said controller being operable to increase the value of said control signal input to said digital valve positioner from said initial value to move from the minimum operating point through a series of operating points having respective control signal values, travel positions and amounts of flow, said series ending in a highest operating point defined by a highest travel position used thus far in the controllable process and the respective control signal value and respective amount of flow,
wherein, for each operating point, said valve positioner stores at least the respective travel position and amount of flow and automatically generates a graphical straight line fitted between a point represented by said minimum travel position and its respective amount of flow and a point represented by said highest travel position and its respective amount of flow, and
said controller using the straight line as a modified installed flow characteristic for said valve to control the controllable process.

11. The apparatus of claim 10, wherein the minimum travel position is zero travel.

12. The apparatus of claim 10, wherein the highest travel position is a highest position to be used in the controllable process.

13. Apparatus for automatic valve characterization of digital valve positioners, comprising:
establishing a control loop including a valve through which fluid is to flow in a controllable process, a digital valve positioner that controls a travel position of the valve in response to a value of an input control signal, and a controller for inputting the control signal to said valve positioner,
said valve having a determined first travel position in the controllable process,
said control signal having a value that controls a travel position of said valve, an initial value of said control signal corresponding to said first travel position of said valve and a respective amount of flow to define a first operating point;
said controller being operable to change the value of said control signal input to said digital valve positioner from said initial value to move from the first operating point through a series of operating points having respective control signal values, travel positions and amounts of flow, said series ending in a second operating point defined by a second travel position used thus far in the controllable process and the respective control signal value and respective amount of flow,
wherein, for each operating point, said valve positioner stores at least the respective travel position and amount of flow and automatically generates a graphical straight line fitted between a point represented by said first travel position and its respective amount of flow and a point represented by said second travel position and its respective amount of flow, and
said controller using the straight line as a modified installed flow characteristic for said valve to control the controllable process.

14. The apparatus of claim 13, wherein the minimum travel position is zero travel.

15. The apparatus of claim 13, wherein the second travel position is a highest position to be used in the controllable process.

16. Apparatus for automatic valve characterization of digital valve positioners, comprising:
establishing a control loop including a valve through which fluid is to flow in a controllable process, a digital valve positioner that controls a travel position of the valve in response to a value of an input control signal, and a controller for inputting the control signal to said valve positioner,
said valve having a determined minimum travel position in the controllable process,
said control signal having a value that controls a travel position of said valve, an initial value of said control signal corresponding to said minimum travel position of said valve and a respective amount of flow to define a minimum operating point;
said controller being operable to increase the value of said control signal input to said digital valve positioner from said initial value to move from the minimum operating point through a series of operating points having respective control signal values, travel positions and amounts of flow, said series ending in a highest operating point defined by a travel position used thus far in the controllable process and the respective control signal value and respective amount of flow, wherein, for each operating point, said valve positioner stores at least the respective travel position and amount of flow, and for each operating point, said valve positioner automatically generates a graphical straight line fitted between a point represented by said minimum travel position and its respective amount of flow and a point represented by the travel position and its respective amount of flow for the respective operating point, and said controller using the straight line as a modified installed flow characteristic for said valve to control the controllable process between the minimum travel position and the selected travel position.

17. The apparatus of claim 16, wherein the minimum travel position is zero travel.

18. The apparatus of claim 16, wherein the highest travel position is a highest position to be used in the controllable process.

* * * * *